Oct. 13, 1964    J. H. POTTS, JR    3,152,545
MID-FIN
Filed Sept. 20, 1961

INVENTOR.
JAMES H. POTTS, JR.

BY

ATTYS.
AGENT.

3,152,545
MID-FIN
James H. Potts, Jr., Silver Spring, Md., assignor to the United States of America as represented by the Secretary of the Navy
Filed Sept. 20, 1961, Ser. No. 139,558
1 Claim. (Cl. 102—4)
(Granted under Title 35, U.S. Code (1952), sec. 266)

The invention described herein may be manufactured and used by or for the Government of the United States of America for governmental purposes without the payment of any royalties thereon or therefor.

This invention relates to an improvement in aerodynamic stabilizers for missiles or the like, and more particularly to a stabilizing fin adapted to be connected to the warhead section of a missile and functioning during the period after the tail fairing has been separated therefrom and before complete deployment of the parachute.

In bombs, mines, torpedoes or the like, that are to be air dropped and sustained in fall by a parachute, a tail fairing having a plurality of guiding fins is generally attached thereto to initially stabilize the load after release from an aircraft. After a brief period of free-fall to allow the bomb to clear the aircraft, the tail fairing is ejected to allow deployment of a parachute. During the brief period after the tail fairing has separated from the warhead and before the parachute opens, the warhead is in a free uncontrolled flight that may result in erratic movement thereof so that the shroud lines of the parachute may become entangled or the missile thrown off course. This erratic flight may further result in contact of the parachute shroud lines with the warhead housing in such a manner as to cut or fray the shroud lines and result in subsequent failure.

An object of this invention, therefore, is to provide an aerodynamic stabilizing means for maintaining the parachute load on a true course during the interval between the change from free flight to parachute sustained fall.

Another object is to provide a plurality of fins attached to the parachute load forward of the tail fairing which are not detachable from the main body.

Still another object is to provide a stabilizing fin that may be attached to the aft section of a parachute load and which on contact with a solid target surface is readily crushed or demolished without puncturing or damage to the load.

A further object of the present invention is to provide a detachable fin which may be attached to a parachute load to provide aerodynamic stability during the interval of free flight after the tail fairing has been ejected and before the parachute opens and assumes the load.

Other objects and many of the attendant advantages will become more readily appreciated as the same becomes better understood by reference to the following detailed description when considered in connection with the accompanying drawing wherein.

Figure 1:
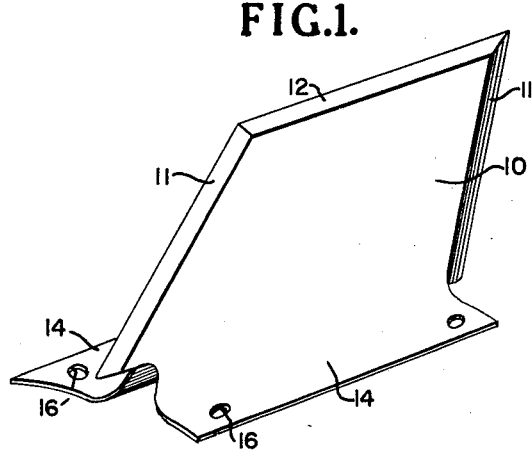
FIG. 1 is a perspective view of a detachable mid-fin of the present invention according to a preferred embodiment thereof.

Referring now to the drawing wherein like reference numerals designate like parts throughout the several views thereof, and more particularly to FIG. 1, there is illustrated a mid-fin 10 formed from a light crushable metal, such, for example, as aluminum or the like. The fin is hollow, each of the two sides being formed with a pair of end flanges 11 and of top flanges 12, corresponding flanges being joined in any suitable manner, such, for example, as by welding, to provide the thickness. The fin may, if desired, be made of a single piece, the top being folded over and the end flanges welded together to provide the required rigidity. The two sides are spread apart at the bottom to provide a pair of missile attachment flanges 14 each extending throughout substantially the length thereof and which are provided with a plurality of holes 16 for receiving rivets or other means for attachment thereof to the housing of a missile.

Figure 2:
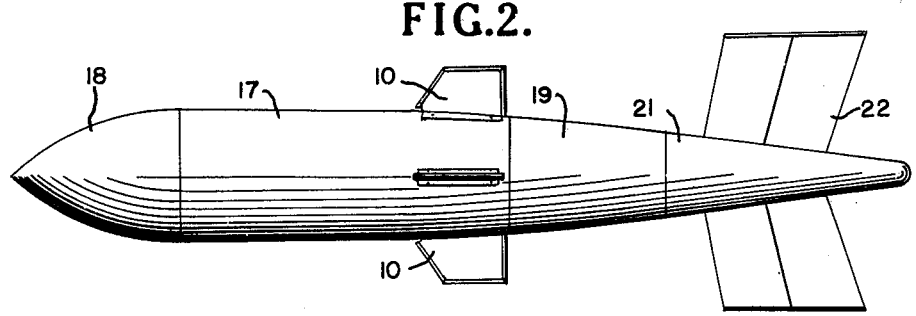
FIG. 2 is an elevational view of the fin attached to a parachute load.

Referring now to FIG. 2, there is illustrated a missile having a warhead section 17, a nose fairing 18, a parachute housing 19 and a tail fairing 21 having a plurality of fins 22 attached thereto. Attached to the warhead section 17 is a plurality of mid-fins 10 formed in accordance with a preferred embodiment of the invention illustrated in FIG. 1. The fins are spaced apart 90° about the warhead section housing and are sufficiently rigid to support the weight of the missile when stockpiled and to resist without deformation the aerodynamic forces applied thereto when the missile is in free flight, yet are fragile enough to be completely crushed by impact with the ground without damage or puncturing of the warhead section of the housing.

Figure 3:
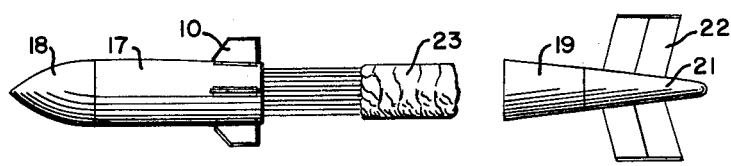
FIG. 3 is an elevational view of the load in flight after ejection of the tail fairing but before opening of the main parachute.

When the missile is of the type to be air dropped by a parachute, the parachute housing 19, the tail fairing 21 with the guiding fins 22 thereon are ejected from the warhead section 17 just previous to the opening of the main parachute, as best illustrated in FIG. 3. A missile not utilizing the mid-fins 10 may, prior to the opening of parachute 23, become erratic in flight, possibly turning end-for-end. The subsequent opening of the parachute exerts a sudden restraining force, which if not directed generally along the longitudinal axis of the missile, may snap the shroud lines or cause cutting of the parachute shroud lines along the edges of the warhead section 17. The missile mid-fins 10 provide aerodynamic stability to the warhead section after ejection of the tail fairing 21 and parachute housing 19 and before complete opening of the parachute 23.

Obviously many modifications and variations of the present invention are possible in light of the above teachings. It is, therefore, to be understood that within the scope of the appended claim, the invention may be practiced otherwise than as specifically described.

What is claimed as new and desired to be secured by Letters Patent of the United States is:

A missile adapted to be dropped from an aircraft in flight comprising:
    a warhead section,
    a detachable tail fairing having a plurality of stabilizing fins mounted thereon,
    a parachute housed within said tail fairing and having the shroud lines thereof attached to said warhead section, and
    a plurality of unitary, hollow mid-fins formed of a light weight metal and secured externally on said warhead section adjacent said tail fairing,
said mid-fins serving to stabilize said warhead section in flight during the interval between detachment of said tail fairing and deployment of said parachute, said mid-fins being of sufficient strength to support the weight of the missile when stockpiled and to resist deformation due to aerodynamic forces and crushable upon contact with a target to preclude radial puncture of said warhead section and damage thereto.

References Cited in the file of this patent

UNITED STATES PATENTS

| | | |
|---|---|---|
| 2,402,716 | Whitsett | June 25, 1946 |
| 2,845,026 | Smith | July 29, 1958 |
| 2,887,055 | Bagdanovich et al. | May 19, 1959 |
| 3,000,597 | Bell et al. | Sept. 19, 1961 |

FOREIGN PATENTS

| | | |
|---|---|---|
| 1,147,642 | France | Nov. 27, 1957 |